No. 754,049. PATENTED MAR. 8, 1904.
T. CARROLL.
CASH REGISTER.
APPLICATION FILED APR. 18, 1903.
NO MODEL. 5 SHEETS—SHEET 1.
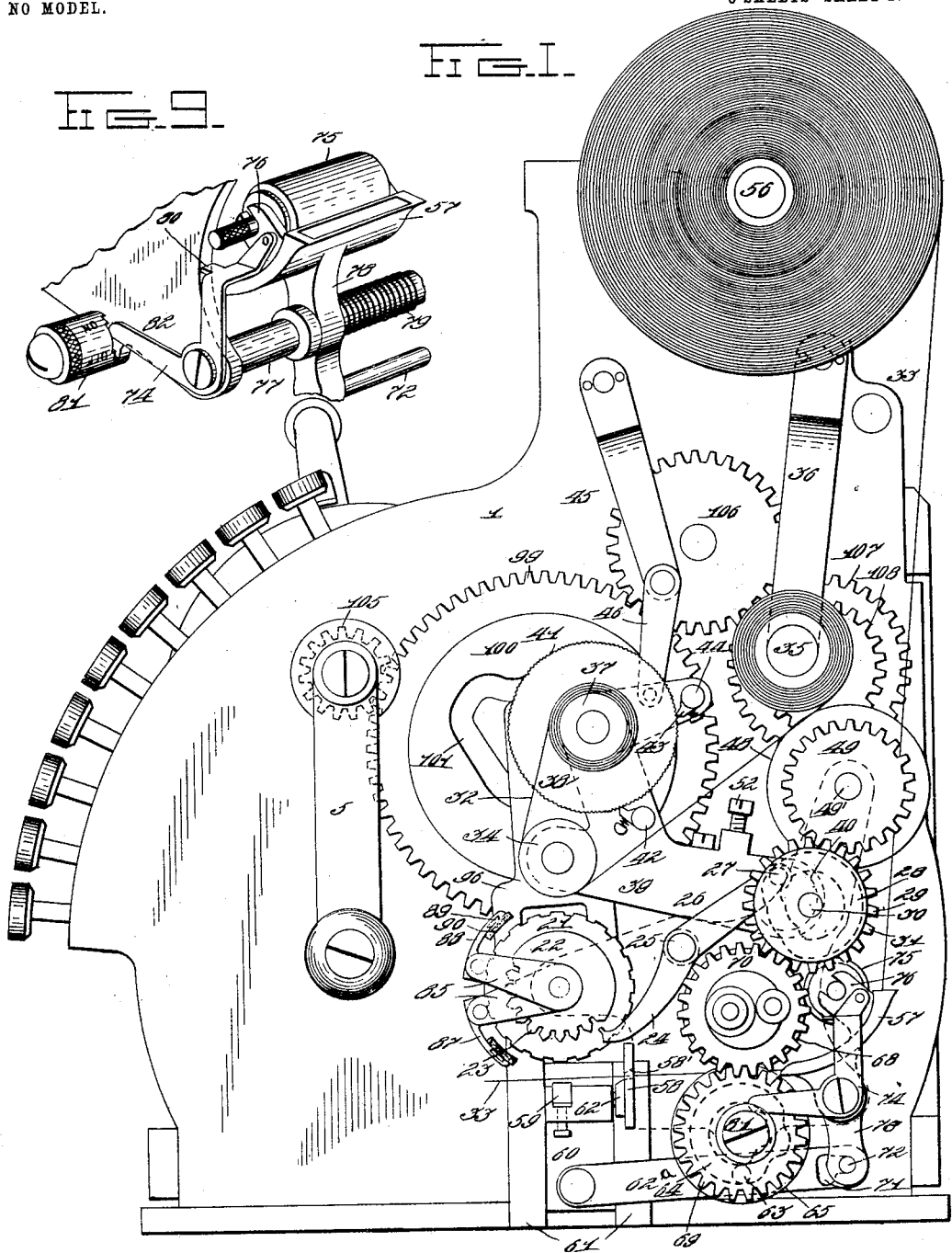

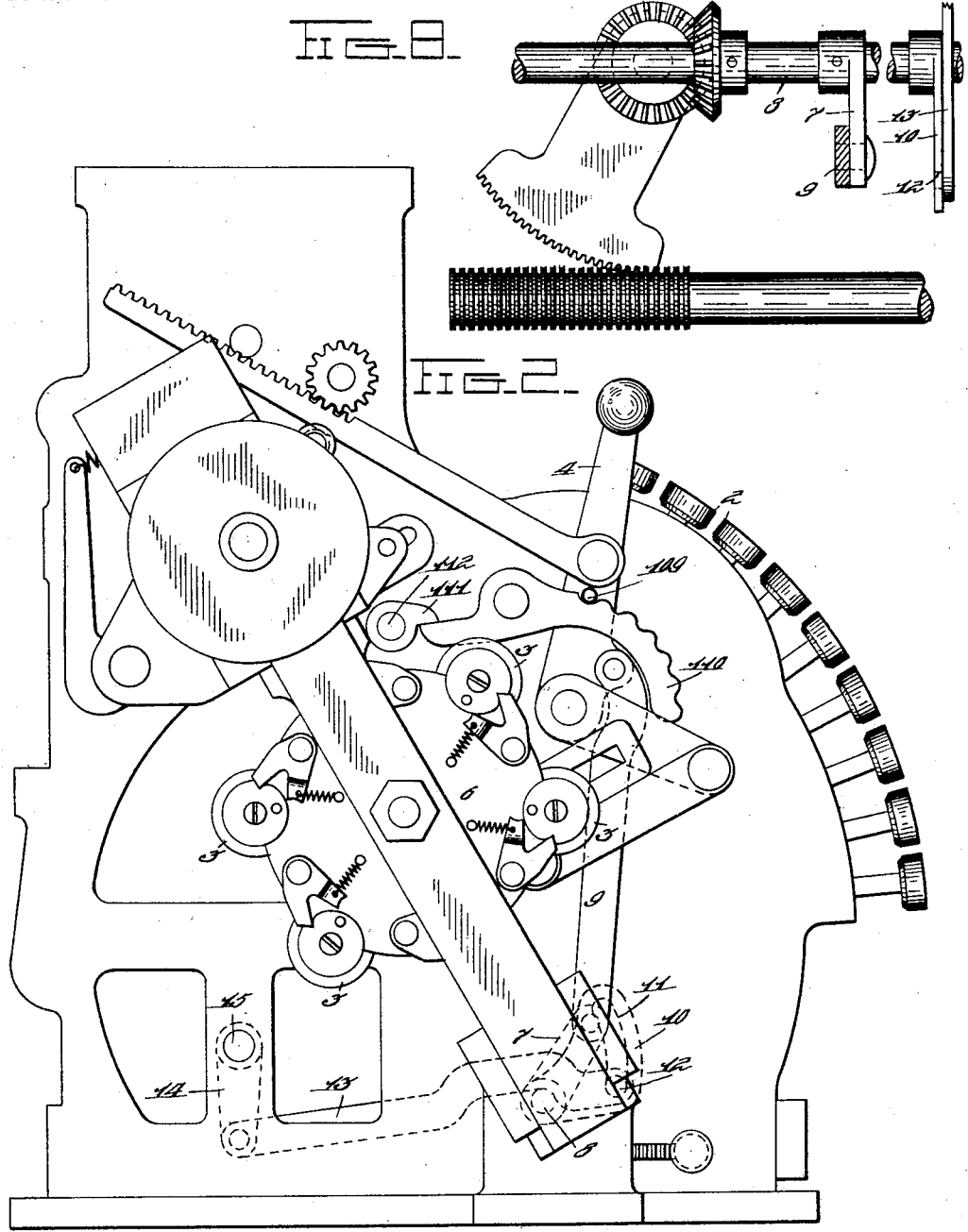

No. 754,049. PATENTED MAR. 8, 1904.
T. CARROLL.
CASH REGISTER.
APPLICATION FILED APR. 18, 1903.
NO MODEL. 5 SHEETS—SHEET 3.
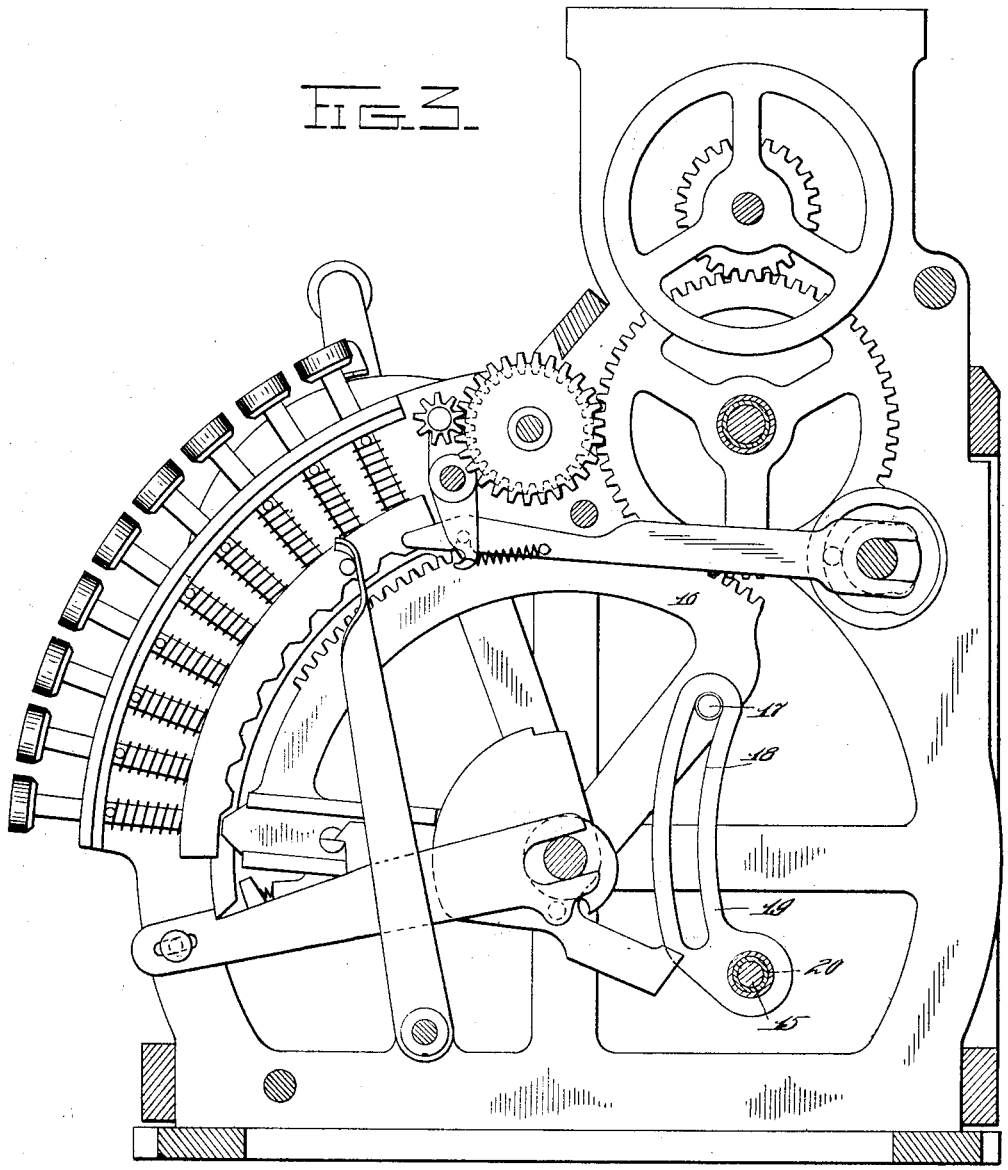

No. 754,049. PATENTED MAR. 8, 1904.
T. CARROLL.
CASH REGISTER.
APPLICATION FILED APR. 18, 1903.
NO MODEL. 5 SHEETS—SHEET 4.
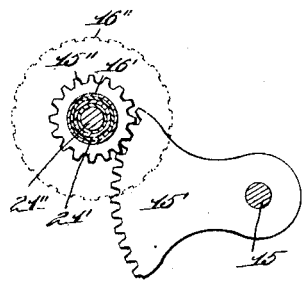
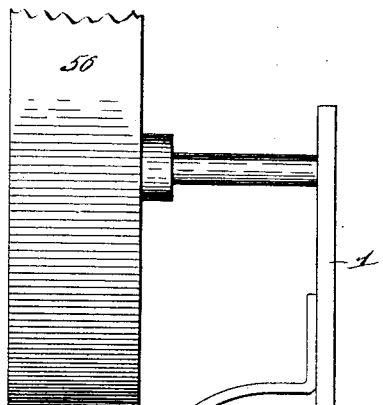
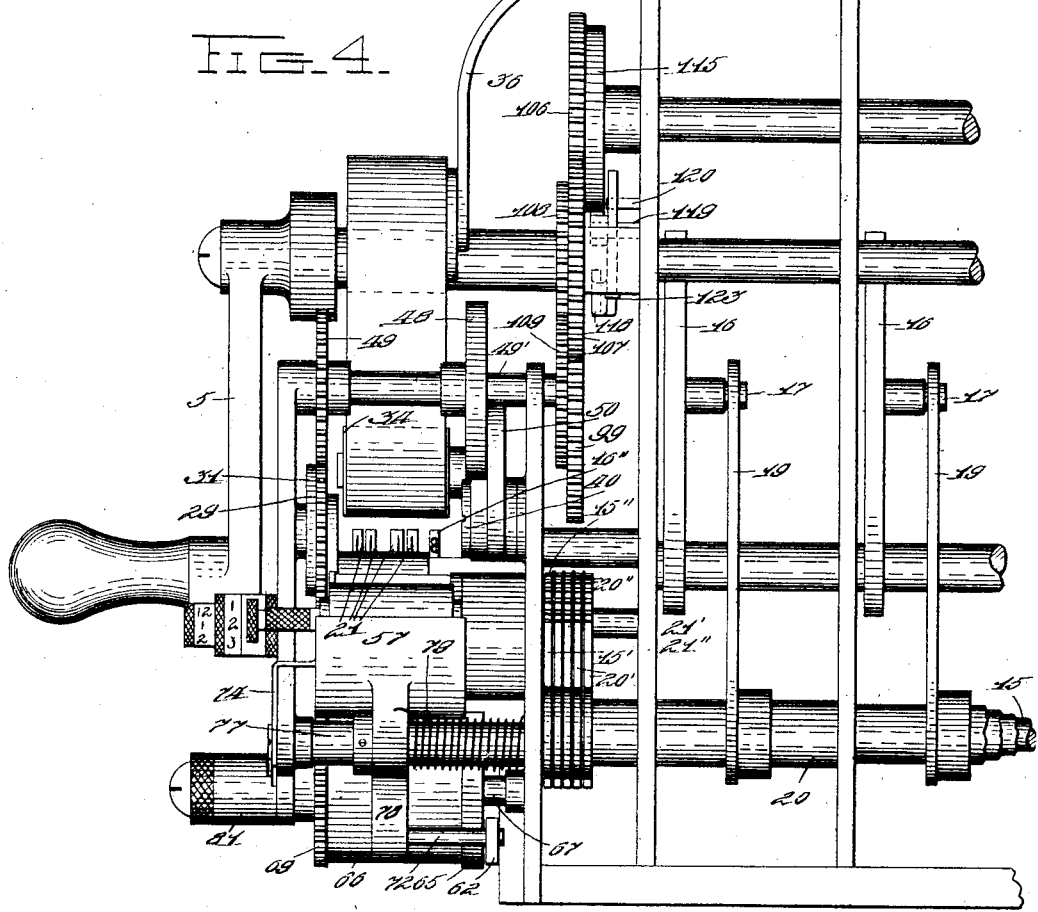
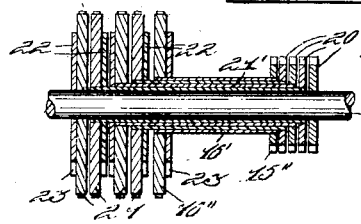
Witnesses
Inventor
Thomas Carroll
Attorneys No. 754,049. PATENTED MAR. 8, 1904.
T. CARROLL.
CASH REGISTER.
APPLICATION FILED APR. 18, 1903.
NO MODEL. 5 SHEETS—SHEET 5.
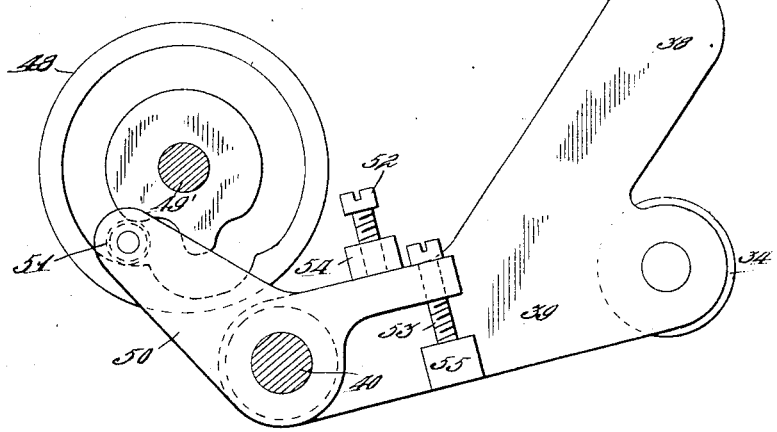
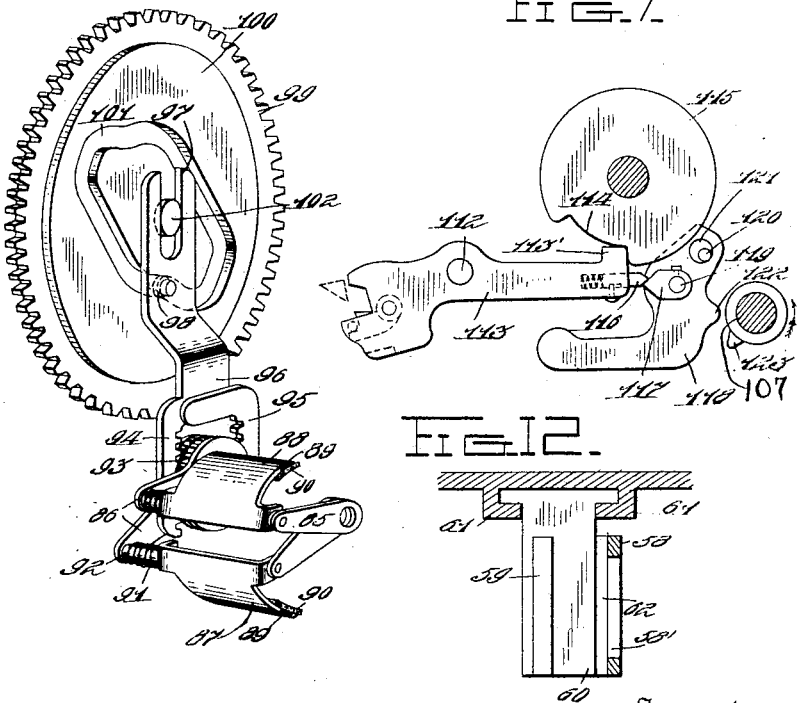

No. 754,049.                                           Patented March 8, 1904.

UNITED STATES PATENT OFFICE.

THOMAS CARROLL, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 754,049, dated March 8, 1904.

Application filed April 18, 1903. Serial No. 153,196. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the so-called "multiple-counter" type.

The present invention is an improvement on the construction shown in my Patent No. 697,981, dated April 22, 1902.

One of the several objects of the invention is to provide an improved form of printing mechanism for a machine of the class mentioned.

A further object is to provide improved locking devices for a machine controlled by a special setting element, which in turn controls a special printing-segment.

The invention consists of certain novel constructions, combinations, and arrangements of parts, all of which will be hereinafter more particularly set forth and claimed.

In the accompanying drawings, forming part of this specification, Figure 1 represents a side elevation of a machine of the type mentioned with my improvements applied thereto, the cabinet and the cash-drawers being omitted. Fig. 2 represents a similar view taken from the opposite side of the machine. Fig. 3 represents a vertical transverse section through the machine. Fig. 4 represents an enlarged detail rear elevation, partly broken away, of the printing devices. Fig. 5 represents an enlarged detail side elevation of the strip-printing platen and its operating devices. Fig. 6 represents an enlarged detail perspective view of the inking-pads and their operating devices. Fig. 7 represents an enlarged detail side elevation of the devices for locking the machine. Fig. 8 represents a detail top plan view of part of the devices connecting the adjusting-lever and the special printer. Fig. 9 represents an enlarged detail perspective view of the inking-roller and its adjusting devices. Fig. 10 represents a detail sectional view, partly in elevation, of the nested sleeves carrying the type-wheels. Fig. 11 represents a detail section, partly in elevation, of said nested sleeves, printer-wheel, and one of the operating rack-segments; and Fig. 12 represents a detail top plan view, partly in section, of the lower platen, knife, and guide.

In the accompanying drawings, forming part of this specification, 1 represents the frame of the machine; 2, the keys; 3, the individual counters; 4, the counter-adjusting lever, and 5 the operating-handle.

As numerous parts referred to and shown in the present application are shown and described in the above-mentioned patent and also in my Patent No. 703,639, dated July 1, 1902, I will refer to both of these patents for such detail descriptions of these parts as are not given hereinafter. Described in general terms, however, the machine to which I have applied my present improvements comprises a series of counter-operating racks or elements which are controlled by a series of amount-keys numbered from "1" to "9" and arranged in banks representing dollars and cents, respectively. The counters 3 are mounted on a rotating drum 6, which is adjusted through suitable gearing by a lever 4. This lever is provided with a suitable pointer or index-finger which travels over an index-plate formed at intervals with suitable characters representing the different clerks or departments. The construction and operation of this lever and also of the counter-operating elements is fully described and illustrated in the aforesaid patent, No. 703,639. The lever 4 is connected to a crank-arm 7, mounted upon a transverse rock-shaft 8 by a pivoted link 9, as best shown in Fig. 2 and 8. The shaft 8 in turn carries a segmental plate 10, formed with an elongated segmental slot 11. A pin 12, mounted on a link-bar 13, projects into slot 11, normally resting in the bottom of the same, as shown in Fig. 2. The link 13 is connected at its rear end to a crank-arm 14, fast upon one end of a transverse rock-shaft 15. The opposite end of the shaft 15 carries a segmental rack 15', which is best shown in Fig. 4, and this rack meshes with a pinion 15''. This pinion is mounted on a sleeve 16', which carries a special printing-wheel 16''. The formation of the slot 11 is eccentric to the shaft 8, whereby when the plate 10 is rocked downward the pin 12 and arm 13 will be gradually cammed forward, and thus rock the shaft 15 to set the special printing-segment.

The main operating elements of the machine which are controlled by the respective banks of keys include a series of operating rack-segments 16, each of which is provided with an antifriction-roller 17, as best shown in Fig. 3. These rollers project into curved slots 18, formed in a series of similarly-shaped arms 19. These arms are mounted, respectively, upon nested sleeves 20, which are supported by the transverse rock-shaft 15. The formation of the slots 18 is such that when the rack-segments 16 are operated the arms 19 will be correspondingly rocked and the sleeves 20 moved to positions corresponding to the values of the keys operated. The right-hand end of each of these sleeves is provided with a segmental rack 20', similar to the rack 15' and meshing with a series of pinions 20'', fast upon the ends of a number of nested sleeves 21', which are mounted upon a short journaled shaft 21''. The outer ends of the sleeves 21' carry a series of type-wheels 21. Each of these wheels is provided with duplicate series of types from "1" to "9," whereby impressions may be taken from above as well as below said wheels. Each of the type-wheels is provided with an alining-disk 22, formed with a series of beveled alining-teeth 23. A locking-plate provided with a series of alining-pawls 24 is pivotally mounted upon a stud 25, projecting from one of the side plates, and is provided with an operating-arm 26, carrying a pin 27 at its rear end. This pin projects into the cam-groove 28 of a box-cam 29, which is journaled upon a stud 30 and is provided with a gear-wheel 31, by means of which motion is transmitted thereto, as hereinafter more particularly described.

By the above-described means the type-wheels 21 are locked and alined after they are set and held in a locked position during the printing operation. As above stated, the type-wheels are capable of simultaneously printing a detail-strip 32 and a check-strip 33, which are arranged above and below the same, respectively. The detail-strip is forced against the types in the upper position by a platen-roller 34, formed of any suitable resilient material. The detail-strip 32 passes from a supply-roller 35, mounted upon a rigid arm 36, about the platen 34, and thence to the storage and winding roller 37. This latter roller is mounted upon an arm 38, formed upon a lever 39, which is pivotally mounted upon the main frame, as at 40, as shown in Figs. 1, 4, and 5. The lever 39 also supports the platen-roller 34. The feeding-roller 37 is provided with a toothed wheel 41, which is engaged by a spring-pressed retaining-pawl 42, mounted on the arm 38, and also by a spring-pressed feeding-pawl 43, mounted upon an arm 44, which is pivoted at the end of an arm 38. The arm 44 is connected to a rigid arm 45, mounted on the main frame by pivoted link 46.

It follows from the above construction that when the lever 39 is operated, as hereinafter described, to cause the platen 34 to force the strip 32 against the type 21 the wheel 41 is moved downward, thus rocking the rear end of the lever 44 upward and forward and causing the pawl 43 to snap over the teeth of said wheel 41. When the parts are now returned to their upper normal position, the rear end of the lever 44 again moves downward, causing the pawl 43 to feed the wheel 41 and roller 37 forward a slight distance and move a fresh portion of the detail-strip into printing position. The lever 39 receives its movements from a box-cam 48, fast upon a shaft 49', which is journaled in the printer-frame. This shaft is provided with a gear-wheel 49, which meshes the aforesaid gear 31. A bell-crank arm 50 is pivotally mounted upon the journal-stud 40 and is provided at one end with an antifriction-roller 51, which projects into the cam-groove of a box-cam 48. The formation of this cam-groove is such as to give the lever 50 a double vibration during each operation of the machine—first, to force the upper ink-pad against the types in printing position, as hereinafter described, and, second, to force the detail-strip into contact with the inked types.

In order to secure the nicety of adjustment necessary in the operation of the platen 34, I connect the levers 39 and 50 by two adjustable screw-bolts 52 and 53. The bolt 52 passes through an arm 54, projecting laterally from the lever 39, and engages the upper surface of the bell-crank lever 50. The bolt 53 passes through said bell-crank lever and engages a projection 55, formed on said lever 39. By this means the levers 39 and 50 are rigidly connected, but may be adjusted in relation to each other at will to secure the proper pressure for the platen 34.

The check-strip 33 passes from a check-supply roller 56, which is mounted upon the main frame, down and through a guiding-chute 57 and forward through a knife-plate 58 and over the check-platen 59. This latter platen is constructed of suitable yielding material and is mounted on a vertically-sliding plate 60, mounted in suitable guide-pieces 61 and carrying a knife-blade 62, (see Fig. 12,) the other cutting member comprising the plate 58, through the slot 58' of which the check-strip passes. The slide 60 is given two reciprocations during each operation of the machine, as hereinafter more fully described. The first of these movements, however, is not sufficient to cause the knife 62 to engage and sever the check-strip. The second movement of the slide causes the movable knife, in conjunction with the knife-blade 58, to sever the check from the check-strip and leave the same in position to be withdrawn by the operator. The slide 60 is given its vertical reciprocations by the lever 62$^a$, which is pivoted at its forward end to said slide and is provided with a laterally-projecting pin 63, which projects into a groove 64 of a box-cam 65, which is secured to the inner end of the feeding-roller 66. This feeding and pressure roller 66 is mounted upon a shaft 67, which is eccentrically journaled in the main frame, whereby when said shaft is partly rotated the roller 66 will be moved out of feeding-contact with the printing-drum 68, which is mounted immediately above the same upon the main frame. The roller 66 carries a gear 69, which meshes with a similar gear 70 on the printing-drum 68. This gear 70 in turn meshes with the gear 31, whereby it receives its motion. The rear end of the lever 62$^a$ is formed with an L-slot 71, into which projects a pin 72, mounted upon an arm 78. When the pin 72 is in the rear portion of the slot 71, as shown in Fig. 1, it acts as a fulcrum for the lever 62$^a$, and the raising and lowering of the pin 63 will thus operate the platen-slide 60 by raising and lowering the forward end of the lever. When the pin 72 is moved forward out of the horizontal portion of the L-slot, the raising and lowering of the pin 63 will simply raise and lower the rear end of the lever. The forward end of the lever pivoted to the slide 60 then becomes its fulcrum. This operation takes place when the check is turned off, as hereinafter described. The types upon the rollers 68 are inked by a felt or other absorbent ink-roller 75. (Best shown in Fig. 9.) This roller is removably mounted in slotted journal-lugs 76, which are secured to the forward face of the guiding-chute 67. This chute is in turn journaled upon a transverse shaft 77 by means of an apertured arm or lever 78, the lower end of which supports the pin 72. This arm is normally forced forward to bring the roller 75 into engagement with the type-cylinder by a coil-spring 79, secured at opposite ends to said shaft and the arm 78. The bell-crank lever 74, which is journaled upon the outer end of the shaft 77, is secured to one of the journal-lugs 76, whereby when said lever is rocked the roller 75 will be moved away from the type-cylinder against the tension of the spring 79. The lever 74 is formed with a stop-lug 80, which abuts against a portion of the main frame to limit the forward movement of the roller 75 under the impulse of the spring 79. The lever 74 is rocked by an adjustable nut 81, which is arranged to be turned into different adjusted positions to rotate the shaft 67, and thus move the roller 66 out of contact with the printing-drum 68 in a manner old and well known in the art. When the parts are in the position shown in Fig. 9, the roller 75 is in contact with the printing-drum. When the nut 81, however, is turned to the left, the forward end of the lever 74 is forced out of a notch 82 in the nut 81, in which it is resting, and is thus rocked upward and rearward. The construction and the operation of the nut 81 and the shaft 67 are old and well known in the art and will need no further description here.

The drum 68 may contain any suitable printing-types, but is preferably constructed with a series of consecutive numbering and dating types, as well as an advertising cut or plate which will print upon the face of the check any desired information.

The device for inking the type-wheels 16" and 21 includes arms 85 and 86, the former journaled upon the outer end of the shaft 21" and the latter upon the outermost sleeve carrying printing-wheels 16". These arms 85 and 86 are arranged in pairs, which are connected by curved plates 87 and 88, pivotally mounted between the same. These plates are formed with suitable dovetail grooves 89, in which are detachably mounted absorbent ink-pads 90. The plates 87 and 88 are held in their normal positions (shown in Fig. 6) by coil-springs 91, which surround the pivot-pins 92, mounted on the arms 86, and engage said arms and said plates. Each of the arms 86 is provided with a pinion 93 fast thereto. These pinions are engaged by rack-arms 94 and 95, respectively, fast to the lower end of a reciprocating slide 96, the racks engaging the respective pinions upon opposite sides. The plate 96 is formed with an elongated slot 97 near its upper end and is provided with a laterally-projecting antifriction-roller 98. An operating-gear 99, journaled upon the frame of the machine, is provided with a disk 100, having a cam-groove 101, into which the roller 98 projects. The upper end of the plate 96 is guided in its reciprocations by a journal-stud 102 of the gear 99, said stud projecting through the slot 97. The formation of the cam-groove 101 is such that the plate 96 is given a single reciprocating movement during each operation of the machine. When the plate moves downward, the arms 85 and 86 are rocked and the plates 87 and 88, carrying the ink-pads, are moved to positions intermediate the respective platens and the type-wheels. The formation of the cam-grooves in the wheels which operate the respective platens is such that each platen is given two movements during each operation of the machine. The first movement forces the ink-pads, which have been moved into position, against the types to ink the same. The second movement forces the detail-strip and the check-strip against the inked types to make the desired impressions. The gear 99, as best shown in Fig. 1, meshes with a pinion 105, carried by the operating-handle 5, and also with a pinion 106, journaled upon the main frame. This pinion 106 meshes with a pinion 107, which is fast upon the outer end of the main rotation-shaft 107ª and has mounted adjacent to it on the same shaft a pinion 108, which meshes with a pinion 109 upon the shaft 49', which carries the pinion 49, as heretofore described. Through the aforesaid chain of gearing the different parts heretofore described receive motion from the operating-handle 5.

As it is desirable in this particular type of machine to compel a setting of some special counter by lever 4 and also the setting of the special type-carrier before the printer can be operated, I provide for unlocking the operating-handle for the printer by the initial movement of the special setting-lever 4. For this purpose the lever is provided with an antifriction-roller 109, which operates upon the notched edge of a pivot-lever 110. This lever at its rear end engages an arm 111, mounted upon a rock-shaft 112. This shaft is provided at its opposite end with a locking-lever 113, the nose 113' of which projects into a notch 114, formed in a locking-disk 115, which is fast to the gear 106, as shown in Fig. 4. The lever 113 is provided with a spring-pressed stop-plunger 116, having a beveled nose which coöperates with a similarly-shaped nose on a projection 117, mounted fast on a pivoted lever or kicker 118, journaled upon a pin 119, projecting from the main frame. The lever 118 is limited in its movements by a pin 120, which projects into an enlarged aperture 121, formed in the lever. The lever 118 is formed with an operating-nose 122, which is arranged to be engaged by a cam-lug 123, formed on the hub of the gear 107, as best shown in Fig. 7.

The parts are in the position shown in Fig. 7 when the machine is in its normal position. Should the lever 4 now be operated, the shaft 112 will be rocked rearward, as hereinbefore described. This operation will force the plunger 116 back into its socket against the tension of its spring until the rear end of the lever 113 has been depressed sufficiently to permit the plunger 116 to again pass forward under the projection 117. When in this position, the locking-nose 113' of the lever 113 will have been moved out of locking engagement with the wall of the notch 114, thus unlocking the machine. When the machine is now operated, the lever 118 will be rocked by the cam 123 upon the main rotation-shaft 107ª and the forward end of said lever caused to engage the lever 113 at the proper point and return the same to its normal locking position with reference to the disk 115. The return movement of the lever 118 causes the plunger 116 to again pass to its normal position above the projection 117, thus securing the latching-lever 113 in its locking position.

It will be observed from the foregoing description that the printing mechanism is normally locked against operation and that in order to release this mechanism it is necessary to first operate the setting-handle 4, which controls the printing-segment for recording the clerk or department to which the transaction is to be credited. It will further be seen that when it is desired to discontinue the printing of checks it is simply necessary to adjust the thumb-nut 81 to the proper position. This adjustment will stop the feeding of the check-paper, will arrest the reciprocations of the platen and the check-cutter, will prevent the inking of the printing-drum, and will temporarily suspend the action of the consecutive number-printing types.

Having thus described my invention, what I claim as new, and desire to secure by Letters Patent, is—

1. In a cash-register the combination with an operating mechanism, of a special type-carrier, a setting device for said carrier, a locking device for the operating mechanism, and means connected to the operating mechanism for positively returning the locking device to its normal position upon each operation of the machine.

2. In a cash-register the combination with an operating mechanism, of a special type-carrier, a setting device for said carrier, a locking-lever for the operating mechanism controlled by the setting device, means for holding the lever in an unlocked position when it is operated, and devices connected to the operating mechanism for positively returning the locking-lever to its normal position upon each operation of the machine.

3. In a cash-register, a printing mechanism including a series of type-carriers, of ink-pads therefor, supports for said ink-pads, carriers for said supports independently journaled concentric to the axis of the type-carriers, means for oscillating said carriers to bring the pads to diametrically opposite sides of said type-carries, and means for forcing the pads against the said type-carriers.

4. In a cash-register, the combination with a series of type-carriers, of ink-pads therefor, supports for said ink-pads, carriers for said supports independently journaled concentric to the axis of said type-carriers, and means for operating said support-carriers for bringing them to the printing-line for inking the type.

5. In a cash-register the combination with a series of type-carriers, of independently-pivoted ink-pad carriers, pinions connected to said carriers, and means for simultaneously operating the pinions in opposite directions to move the pad-carriers to opposed points of the type-carriers.

6. In a cash-register the combination with a series of printing-wheels, of ink-pad carriers independently pivoted and mounted concentric to the axis of said wheels, and means for independently operating said ink-pad carriers for bringing them to the printing-points upon the opposite sides of said type-carriers.

7. In a cash-register the combination with a series of type-carriers, of a series of independent ink-pad carriers pivoted concentrically to the axis of said type-carriers, pinions connected to said ink-pad carriers, and a movable member having duplicate rack-bars for engaging the respective pinions.

8. In a cash-register the combination with a series of type-wheels, of independent ink-pad carriers mounted concentrically to the axis of the printing-wheels, pinions connected to the respective carriers, a reciprocating bar carrying racks which engage the respective pinions, and means for reciprocating the said bar.

9. In a cash-register the combination with an operating mechanism, of a platen mounted on a reciprocated slide, a knife carried by said slide, a stationary knife, and means for reciprocating the slide and means for disabling the reciprocating means.

10. In a cash-register the combination with type-carriers, of a platen, a platen-operating lever, means for operating the lever, and means for changing the fulcrum of the lever whereby it will operate the platen or not, as desired.

11. In a cash-register the combination with type-carriers, of a platen, a printing-drum, a pressure-roller, an ink-roller, and a common means for preventing the pressure-roller and the ink-roller from engaging the printing-drum and for preventing the operation of the platen.

12. In a cash-register the combination with an operating mechanism, of a special type-carrier, a setting device for said carrier, a locking-lever for the operating mechanism controlled by the setting device, a spring device for holding the locking device in its unlatching position, and means connected to the operating mechanism for positively returning the locking-lever to its normal position upon each operation of the machine.

13. In a cash-register, a printing mechanism including a series of type-carriers, of ink-pads therefor, supports for said ink-pads movable against spring tension, independent carriers for said supports, and a common means for simultaneously operating said support-carriers to move them in opposite directions.

14. In a cash-register the combination with a series of type-carriers, of pivoted ink-pad carriers, pinions connected to said carriers, and a reciprocating rack arranged to operate said pinions to move the carriers in opposite directions.

15. In a cash-register a printing mechanism including a series of type-carriers, pivoted ink-pad carriers mounted concentric to the axis of the type-carriers, pinions connected to said pivoted carriers, and a movable operating-bar having rack-teeth which engage the respective pinions upon opposite sides whereby the movement of said bar will actuate the pad-carriers simultaneously in opposite directions.

16. In a cash-register the combination with a printing mechanism, of a movable knife, a lever for operating said knife, a shiftable fulcrum-pin for said lever and means for operating the lever.

17. In a cash-register the combination with a platen, of a lever for operating the same, a shiftable fulcrum-pin for said lever, and means for operating the lever.

18. In a cash-register the combination with type-carriers, of a slide carrying a platen, a pivoted lever connected at one end to said slide, a shiftable fulcrum-pin for the opposite end of the lever, and means for imparting movement to the lever at a point intermediate its two ends.

19. In a cash-register the combination with a printing mechanism, of a platen, a lever connected to the platen, feeding-rollers, means for adjusting said rollers in relation to each other, and a fulcrum for said lever controlled by said adjusting means.

20. In a cash-register the combination with a platen, of an operating-lever for the same, a printing device, an inking means for said device, adjusting mechanism for drawing the inking means away from the printing device, and a fulcrum-pin for the platen-operating lever shifted by said adjusting mechanism.

21. In a cash-register the combination with a platen, of a lever for operating the same, a printing device, an inking-roller for said device, a spring for normally holding the roller in contact with the printing device, adjusting means for moving the roller out of contact with the printing device, and a fulcrum-pin for the operating-lever carried by the adjusting device.

22. In a cash-register the combination with an operating mechanism, of a type-carrier, means for setting the type-carrier, a lock for the operating mechanism, tripped by said setting means, holding means for holding the lock in its tripped position, and means connected to the operating mechanism for positively returning the lock to its locking position.

23. In a cash-register, the combination with an operating mechanism, of a special type-carrier, a special lever for setting said carrier, a locking-lever for said operating mechanism tripped by said special lever, a spring-pressed plunger coöperating with the said locking-lever to hold the same in tripped position, a resetting-lever for returning said locking-lever to normal position, and a cam projection moved by the operating mechanism to actuate said resetting-lever at each operation of the machine.

24. In a cash-register, the combination with a series of type-carriers and a platen therefor, of an operating-lever for said platen, a pin carried on said lever, a revoluble operating member formed with a cam-groove for engaging said pin and actuating said operating-lever, and adjustable means for preventing the movement of said revoluble member from moving said platen.

25. In a cash-register, the combination with a series of type-carriers and a platen therefor, of an operating-lever for said platen, a pin carried on said lever, a revoluble operating member formed with a cam-groove for engaging said pin and actuating said operating-lever, and adjustable means for preventing the travel of said pin within said groove from causing said lever to move said platen.

26. In a cash-register, a printing mechanism including a series of type-carriers and platens therefor, independent ink-pad carriers having mounted thereon pad-supports movable against spring tension, pinions connected to said carriers, a double rack-bar formed with teeth to engage said pinions upon opposite sides whereby to move said carriers in opposite directions, a pin formed on said rack-bar, and an operating-gear formed with a cam-groove to engage said pin and operate said rack-bar.

27. In a cash-register, the combination with a series of type-wheels, of a platen, an operating-lever for said platen carrying a pin at its central portion and formed with an L-shaped slot in its outer portion, a printing-roller, a feed-roller formed with a cam-groove for engaging said pin on said operating-lever, an ink-roller for said printing-roller, a rocking arm carrying said ink-roller and provided with a pin for engaging said L-shaped slot, hand manipulative means for adjusting said feed-roller, and connections between the latter and said rocking arm.

In testimony whereof I affix my signature in the presence of two witnesses.

THOMAS CARROLL.

Witnesses:
WM. H. MUZZY,
JNO. J. UNGVARY.